3,574,747
AMIDES OF DIAMINOACIDS

George S. Denning, Jr., Norwich, N.Y., assignor to
The Norwich Pharmacal Company
No Drawing. Filed Mar. 29, 1968, Ser. No. 717,388
Int. Cl. C07c *103/50*
U.S. Cl. 260—561  12 Claims

ABSTRACT OF THE DISCLOSURE

New amides of diaminoacids of the formula:

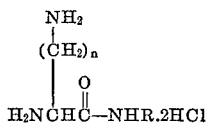

wherein R is a higher alkyl ($C_{12}$–$C_{18}$) group and $n$ is 2–4 possess a broad antibacterial spectrum for topical application.

wherein R is a higher alkyl ($C_{12}$–$C_{18}$) group and $n$ is 2–4 and their preparation.

These compounds are antibacterial agents. They have a broad antibacterial spectrum encompassing gram negative and gram positive bacteria. Illustrative of their antibacterial potency is the following table in which the numbers indicate the concentration of the compound in micrograms per milliliter sufficient to inhibit the growth of bacteria:

$$\begin{array}{c} NH_2 \\ | \\ (CH_2)_n \\ | \\ H_2NCHCNHR \cdot 2HCl \end{array}$$

| $n$ | R | E. coli | S. typhosa | P. aeruginosa | S. aureus | S. fecalis | A. aerogenes | Sh. flexneri | C. liquifaciens |
|---|---|---|---|---|---|---|---|---|---|
| 4 | $C_{16}H_{33}$ | 6.25 | 6.25 | 25 | 1.5 | 1.5 | 25 | 6.25 | 3.1 |
| 4 | $C_{12}H_{25}$ | 25 | 12.5 | 50 | 12.5 | 6.25 | 50 | 25 | 12.5 |
| 4 | $C_{15}H_{31}$ | 6.25 | 3.1 | 12.5 | 3.1 | 1.5 | 12.5 | 6.25 | 0.75 |
| 4 | $C_{14}H_{29}$ | 3.1 | 3.1 | 25 | 3.1 | 6.25 | 6.25 | 6.25 | 0.75 |
| 4 | $C_{18}H_{37}$ | 25 | 25 | >50 | 1.5 | 1.5 | >50 | >50 | 0.75 |
| 3 | $C_{15}H_{31}$ | 3.1 | 12.5 |  | 3.1 | 3.1 | 25 | 6.25 | 0.75 |
| 3 | $C_{14}H_{29}$ | 6.25 | 6.25 |  | 3.1 | 3.1 | 25 | 6.25 | 0.75 |
| 3 | $C_{16}H_{33}$ | 6.25 | 12.5 |  | 1.5 | 1.5 | 50 | 12.5 | 0.75 |
| 2 | $C_{16}H_{33}$ | 50 | >50 | >50 | 6.25 | 6.25 | 50 | >50 | 1.5 |
| 2 | $C_{15}H_{31}$ | 6.25 | 25 | 25 | 3.1 | 6.25 | >50 | 25 | 1.5 |

This invention relates to chemical compounds. More particularly it is concerned with amides of diaminoacids such as lysine, ornithine and diaminobutyric acid of the formula:

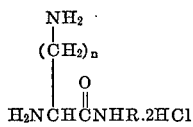

By virtue of their antibacterial properties and their relatively low toxicity these compounds are readily adapted to be combined in various forms such as ointments, dusts, sprays, solutions, pastes, gels and the like using readily available adjuvants and excipients known in the art to provide compositions suitable for topical application designed to control and eradicate bacterial contamination. The concentration of said compounds in said compositions permits wide latitude in choice. Concentrations providing the requisite antibacterial concentration range from 0.1–1.0% by weight of the composition.

The methods contemplated for preparing the compounds of this invention can best and most concisely be expressed in the following schema:

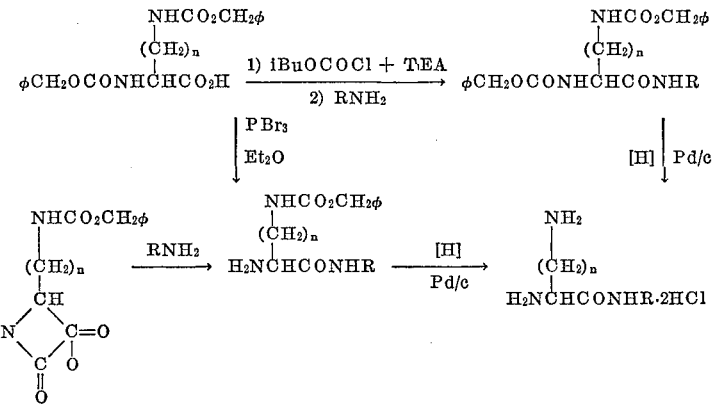

In the foregoing schema the symbols R and $n$ have the significance previously given thereto and other shorthand representations are fully within the ken of those skilled in the art.

To more fully apprise those skilled in the art how to prepare the compounds of this invention the following illustrative examples are appended recognizing that there will occur to those to whom this specification is addressed obvious variations, substitutions and modifications:

EXAMPLE I

L-lysinehexadecylamide dihydrochloride

In a 100 ml. one-neck flask fitted with a drying tube was dissolved a 100% excess of hexadecylamine (7.44 g., 0.0308 mole) in tetrahydrofuran, and the murky solution was stirred magnetically. The N-carboxyanhydride of $N^6$-benzyloxycarbonyl-L-lysine (4.72 g., 0.0154 mole) was dissolved in tetrahydrofuran and added to this stirring solution. (Part of the carboxyanhydride sample formed an insoluble gum when tetrahydrofuran was added. This was not included in the reaction mixture.)

A white precipitate formed with some foaming due to carbon dioxide evolution. The flask was fitted with a condenser, and the suspension was refluxed with stirring. After 1 hr. some hot tetrahydrofuran insoluble material was filtered off (wt. 0.63 g.; M.P. 160–170° gel). Upon cooling the filtrate, a waxy white solid precipitated and was filtered off (wt. 4.16 g.). This was triturated with hexane to extract the excess amine, filtered, dried, and analyzed (M.P. 94–97°).

*Analysis.*—Calcd. for $C_{30}H_{53}N_3O_3$: C, 71.52; H, 10.60; N, 8.34. Found: C, 71.47; H, 10.85; N, 8.23.

Another sample was isolated by evaporating the tetrahydrofuran filtrate and triturating with hexane, to bring the total yield of $N^6$-benzyloxycarbonyl-L-lysinehexadecylamide to 89.3%.

In a 100 ml., one-neck flask fitted with a condenser, bubbling tube, and carbon dioxide outlet, was suspended $N^6$-benzyloxycarbonyl-L-lysinehexadecylamide (3.53 g., 0.007 mole) in methanol. A 10% excess of concentrated hydrochloric acid (1.29 ml., 0.0154 mole) was added causing most of the amide to dissolve. The 5% palladium on charcoal catalyst (1 g.; 50% water by weight) was added, and the suspension was stirred magnetically at room temperature. Hydrogen was slowly bubbled through. Carbon dioxide was given off after 45 min. After 6 hr., the catalyst was filtered off and the filtrate evaporated to a syrup. This was triturated with acetone to precipitate a granular white solid which was filtered off, rinsed, dried and analyzed (wt. 2.81 g., M.P. gel 109°). The yield of L-lysinehexadecylamide dihydrochloride was 90.6%.

*Analysis.*—Calcd. for $C_{22}H_{47}N_3O.2HCl$: C, 59.70; H, 11.16; N, 9.49. Found: C, 59.60; H, 11.29; N, 9.20.

EXAMPLE II

L-lysinedodecylamide dihydrochloride hemihydrate

In a 100 ml., one-neck flask fitted with a drying tube was dissolved a 100% excess of dodecylamine (3.21 g., 0.01730 mole) in tetrahydrofuran, and the murky solution was stirred magnetically. The N-carboxyanhydride of $N^6$-benzyloxycarbonyl-L-lysine (2.65 g., 0.00865 mole) was dissolved in tetrahydrofuran and added to this stirring solution. (Part of the N-carboxyanhydride sample formed an insoluble gum when tetrahydrofuran was added. This was not included in the reaction mixture.)

A white precipitate formed, with some foaming due to carbon dioxide evolution. The flask was fitted with a condenser, and the suspension was refluxed with stirring. After 2 hours some hot tetrahydrofuran insoluble material was filtered off (wt. 0.62 g.; M.P. 160–180°).

Upon cooling the filtrate, needle-like crystals precipitated and were filtered off (wt. 0.08 g.; M.P. 57–62°). Both of these samples were discarded as impurities.

The filtrate was evaporated and the residue triturated with hexane to obtain a solid (wt. 1.82 g.; M.P. 90–91°).

*Analysis.*—Calcd. for $C_{26}H_{45}N_3O_3$: C, 69.75; H, 10.13; N, 9.38. Found: C, 69.44; H, 10.10; N, 9.26.

Further work-up of the filtrate brought the total yield of $N^6$-benzyloxycarbonyl-L-lysinedodecylamine to 71.3%.

In a 100 ml., one-neck flask fitted with a condenser, bubbling tube, and carbon dioxide outlet was suspended $N^6$-benzyloxycarbonyl - L - lysinedodcylamide (3.13 g., 0.007 mole) in methanol. A 10% excess of concentrated hydrochloric acid (1.29 ml., 0.0154 mole) was added causing part of the amide to dissolve. The 5% palladium on charcoal catalyst (1. g.; 50% water by weight) was added, and the suspension was stirred magnetically at room temperature. Hydrogen was slowly bubbled through. Carbon dioxide was given off after 45 minutes. After 4½ hr., the catalyst was filtered off and the filtrate evaporated to a syrup. Addition of ether gave a white oil. This was evaporated again and acetone added. After trituration, the acetone was decanted and the gummy white residue was dried in the flask. The resulting powder (very hygroscopic) was scraped out and analyzed (wt. 1.29 g.; M.P. 70–75° gel). The yield of L-lysinedodecylamide dihydrochloride hemihydrate was 88.2%.

*Analysis.*—Calcd. for $C_{18}H_{39}O.2HCl.\frac{1}{2}H_2O$: C, 54.67; H, 10.70; N, 10.62. Found: C, 54.68; H, 10.49; N, 10.61.

EXAMPLE III

L-lysinepentadecylamide dihydrochloride

A. Preparation of $N^2$-, $N^6$-di-benzyloxycarbonyl-L-lysinepentadecylamide.—In a 250 ml., three-neck flask fitted with a stirrer, stopper and drying tube was dissolved $N^2,N^6$-di-benzyloxycarbonyl-L-lysine (10.36 g., 0.025 mole) in 20 ml. of tetrahydrofuran. The solution was cooled to 0° and triethylamine (3.24 ml., 0.025 mole) was added. This solution was then stirred rapidly and cooled to $-5°$ to $-10°$ in an acetone/ice bath. The isobutyl chloroformate (3.24 ml., 0.025 mole) was added, causing triethylamine hydrochloride to precipitate immediately. The mixture was stirred for 40 min. at $-5°$.

In a separate vessel a 20% excess of pentadecylamine (6.82 g., 0.03 mole) was partially dissolved in tetrahydrofuran and was added to the mixed anhydride. The resulting thick mixture was diluted with more tetrahydrofuran and stirred vigorously for 2½ hours at room temperature.

The triethylamine hydrochloride was filtered off and 25 ml. of water was added to the filtrate. The tetrahydrofuran was evaporated and the water insoluble material was filtered off, rinsed with water and dried. It was further triturated with hexane and then recrystallized from hot ethanol to give a waxy white solid (wt. 14.34 g.; M.P. 110–114°). The yield was 91.9%.

*Analysis.*—Calcd. for $C_{37}H_{57}N_3O_5$: C, 71.23; H, 9.20; N, 6.73. Found: C, 71.23; H, 9.12; N, 6.81.

B. Preparation of L-lysinepentadecylamide dihydrochloride.—In a 500 ml., one-neck flask fitted with a condenser, bubbling tube and carbon dioxide outlet was suspended $N^2$-, $N^6$-di-benzyloxycarbonyl-L-lysinepentadecylamide (14.32 g., 0.023 mole) in methanol. A 10% excess of concentrated hydrochloric acid (4.22 ml., 0.0506 mole) and 5% palladium on charcoal catalyst (5 g.; 50% water by weight) were added. The suspension was stirred magnetically and hydrogen slowly bubbled through. Carbon dioxide was given off after 1½ hrs. After 2½ hrs. the starting material was still a waxy cake so a water bath was set up and the mixture warmed to 45–50°. Carbon dioxide was still evolved after 10 hrs. The catalyst was filtered off after 11½ hrs. and the filtrate evaporated to a sticky residue. This was dried in vacuo over phosphorus pentoxide until a solid formed which was scraped out and pulverized (wt. 9.4 g., M.P. gel 65°). The yield was 95%.

*Analysis.*—Calcd. for $C_{21}H_{45}N_3O.2HCl$: C, 58.85; H, 11.05; N, 9.80. Found: C, 58.81; H, 10.57; N, 9.97.

EXAMPLE IV

L-lysinetetradecylamide dihydrochloride

A. Preparation of $N^2$-, $N^6$-di-benzyloxycarbonyl-L-lysinetetradecylamide.—In a 250 ml., three-neck flask fitted with a stirrer, stopper and drying tube was dissolved $N^2$-, $N^6$-di-benzyloxycarbonyl-L-lysine (7.46 g., 0.018 mole) in 25 ml. of tetrahydrofuran. The solution was cooled to 0° and triethylamine (2.50 ml., 0.018 mole) added. This solution was then stirred rapidly and cooled to −5° to −10° in an acetone/ice bath. The isobutyl chloroformate (2.33 ml., 0.018 mole) was added, causing triethylamine hydrochloride to precipitate immediately. The mixture was stirred for 20 min. at −5°.

In a separate vessel a 20% excess of tetradecylamine (4.70 g., 0.022 mole) was partially dissolved in tetrahydrofuran and was added to the mixed anhydride. The resulting thick mixture was diluted with more tetrahydrofuran and stirred vigorously at room temperature overnight.

The insoluble material was filtered off and 25 ml. of water was added to the filtrate. The tetrahydrofuran was evaporated and the water insoluble material was filtered off, dried, and further triturated with hexane to give an analytical sample (wt. 10.84 g.; M.P. 100–115°). The yield was 98.7%.

*Analysis.*—Calcd. for $C_{36}H_{55}N_3O_5$: C, 70.90; H, 9.09; N, 6.89. Found: C, 70.92; H, 9.28; N, 6.70.

B. Preparation of L-lysinetetradecylamide dihydrochloride.—In a 500 ml., one-neck flask fitted with a condenser, bubbling tube and carbon dioxide outlet was suspended $N^2$-, $N^6$-di-benzyloxycarbonyl-L-lysinetetradecylamide (10.66 g., 0.017 mole) in methanol. A 10% excess of concentrated hydrochloric acid (3.12 ml., 0.0374 mole) and 5% palladium on charcoal catalyst (5 g.; 50% water by weight) were added. The suspension was stirred magnetically, warmed in a water bath at 45–50°, and hydrogen slowly bubbled through. Carbon dioxide given off after ½ hr. Evolution had ceased after 7 hrs. The catalyst was filtered off and the filtrate evaporated to a liquid. Acetone was added, and the solution cooled in the refrigerator until a precipitate formed. This was filtered off, dried, and analyzed (wt. 6.07 g.; M.P. 70° gel). The yield was 86%.

*Analysis.*—Calcd. for $C_{20}H_{43}N_3O\cdot 2HCl$: C, 57.95; H, 10.94; N, 10.13. Found: C, 58.13; H, 11.02; N, 9.78.

EXAMPLE V

L-lysineoctadecylamide dihydrochloride

In a 250 ml., one-neck flask fitted with a condenser and drying tube was dissolved a 100% excess of octadecylamine (16.17 g., 0.06 mole) in warm tetrahydrofuran, and the murky solution was stirred magnetically. The N-carboxyanhydride of $N^6$-benzyloxycarbonyl-L-lysine (9.19 g., 0.03 mole) was dissolved in tetrahydrofuran and added to this stirring solution. A white foam appeared immediately. The mixture was refluxed with stirring for 1½ hr., after which the hot insoluble material was filtered off (1.06 g.). Upon cooling the filtrate, a precipitate formed which was filtered off (12.19 g.). This was further recrystallized from tetrahydrofuran to remove the hot and cold insoluble impurities, and the filtrate was evaporated to a residue which was triturated with hexane, filtered, dried and analyzed (wt. 8.49 g.; M.P. 96–99°).

*Analysis.*—Calcd. for $C_{32}H_{57}N_3O_3$: C, 72.27; H, 10.80; N, 7.90. Found: C, 72.24; H, 10.99; N, 7.86.

The original filtrate (from the 12.19 g.) was evaporated, and the residue treated with tetrahydrofuran and hexane in the same manner to give more of the product. The total yield of $N^6$-benzyloxycarbonyl-L-lysineoctadecylamide was 68.8%.

In a 125 ml., one-neck flask fitted with a condenser, bubbling tube, and carbon dioxide outlet was suspended $N^6$-benzyloxycarbonyl-L-lysineoctadecylamide (3.72 g.; 0.007 mole) in methanol. A 10% excess of concentrated hydrochloric acid (1.29 ml., 0.0154 mole) was added causing most of the amide to dissolve. The 5% palladium on charcoal catalyst (1 g.; 50% water by weight) was added and the suspension was stirred magnetically at room temperature. Hydrogen was slowly bubbled through. Carbon dioxide was given off after ½ hr. After 5½ hr. the catalyst was filtered off and the filtrate evaporated to a milky syrup. This was triturated with acetone to precipitate a solid which was filtered off, rinsed, dried and analyzed (wt. 3.21 g.; M.P. 60–68° gel). The yield of L-lysineoctadecylamide dihydrochloride was 97.6%.

*Analysis.*—Calcd. for $C_{24}H_{51}N_3O\cdot 2HCl$: C, 61.25; H, 11.35; N, 8.92. Found: C, 59.31; H, 11.19; N, 9.08.

EXAMPLE VI

L-ornithinepentadecylamide dihydrochloride hemihydrate

A. Preparation of $N^2$-, $N^5$-di-benzyloxycarbonyl-L-ornithinepentadecylamide.—In a 250 ml., three-neck flask fitted with a stirrer, stopper and drying tube was dissolved $N^2$-, $N^5$-di-benzyloxycarbonyl-L-ornithine (71.21 g., 0.018 mole) in 35 ml. of tetrahydrofuran. The solution was cooled to 0° and triethylamine (2.50 ml. 0.018 mole) added. This solution was then stirred rapidly and cooled to −5° to −10° in an acetone/ice bath. The isobutyl chloroformate (2.33 ml., 0.018 mole) was added, causing triethylamine hydrochloride to precipitate immediately. The mixture was stirred for 20 min. at −5°.

In a separate vessel a 20% excess of pentadecylamine (5.00 g., 0.022 mole) was partially dissolved in tetrahydrofuran and was added to the mixed anhydride. The resulting thick mixture was diluted with more tetrahydrofuran and stirred vigorously for 3 hr. at room temperature.

The insoluble material was filtered off, triturated with water to dissolve triethylamine hydrochloride, dried and analyzed (wt. 4.86 g.; M.P. 130–136°).

*Analysis.*—Calcd. for $C_{36}H_{55}N_3O_5$ (percent): C, 70.90; H, 9.09; N, 6.89. Found (percent): C, 71.09; H, 9.27; N, 6.99.

Water (25 ml.) was added to the original filtrate and the tetrahydrofuran was evaporated. The water insoluble material was filtered off, dried, and further triturated with hexane to give a second crop (wt. 6.24 g.; M.P. 127–134°). This sample also analyzed correctly. The total yield was 100%.

B. Preparation of L-ornithinepentadecylamide dihydrochloride hemihydrate.—In a 500 ml., one-neck flask fitted with a condenser, bubbling tube and carbon dioxide outlet was suspended $N^2$-, $N^5$-di-benzyloxycarbonyl-L-ornithinepentadecylamide (10.92 g., 0.018 mole) in methanol. A 10% excess of concentrated hydrochloric acid (3.30 ml., 0.0396 mole) and 5% palladium on charcoal catalyst (5 g.; 50% water by weight) were added. The suspension was stirred magnetically, warmed in a water bath at 45–50° and hydrogen slowly bubbled through. Carbon dioxide was given off after 1 hr. Evolution had ceased after 9 hr. After 10 hr. the catalyst was filtered off and the filtrate evaporated to a solid residue. This was triturated with acetone, filtered, dried and analyzed (wt. 6.10 g.; M.P. 75–85° gel.). The yield was 80.1%.

*Analysis.*—Calcd. for $C_{20}H_{43}N_3O\cdot 2HCl\cdot \tfrac{1}{2}H_2O$: C, 56.721; H, 10.948; N, 9.922. Found: C, 56.56; H, 10.90; N, 9.84.

EXAMPLE VII

L-ornithinetetradecylamide dihydrochloride tetratohydrate

A. Preparation of $N^2$-, $N^5$-di-benzyloxycarbonyl-L-ornithinetetradecylamide.—In a 250 ml., three-neck flask fitted with a stirrer, stopper and drying tube was dissolved $N^2$-, $N^5$-di-benzyloxycarbonyl-L-orithine (10.01 g., 0.025 mole) in 25 ml. of tetrahydrofuran. The solution was cooled to 0° and triethylamine (3.47 ml., 0.025 mole) added. This solution was then stirred rapidly and cooled to −5° to −10° in an acetone/ice bath. The isobutyl chloroformate (3.24 ml., 0.025 mole) was added, causing triethylamine hydrochloride to precipitate immediately. The mixture was stirred for 25 min. at −5°.

In a separate vessel, a 20% excess of tetradecylamine (6.40 g., 0.03 mole) was partially dissolved in tetrahydrofuran and was added to the mixed anhydride. The resulting thick mixture was diluted with more tetrahydrofuran and stirred vigorously for 2 hr. at room temperature.

The insoluble material was filtered off and 25 ml. of water was added to the filtrate. The tetrahydrofuran was evaporated and the water insoluble material was filtered off, rinsed with water and dried. It was further triturated with hexane, filtered, dried, and analyzed (wt. 10.53 g.; M.P. 130–134°).

*Analysis.*—Calcd. for $C_{35}H_{53}N_3O_5$: C, 70.55; H, 8.96; N, 7.05. Found: C, 70.61; H, 9.00; N, 6.98.

The original tetrahydrofuran insoluble material was triturated with water to dissolve the triethylamine hydrochloride, filtered, and dried (wt. 3.70 g.; M.P. 131–135°). This sample also analyzed correctly. The total yield was 95.5%.

B. *Preparation of L-ornithinetetradecylamide dihydrochloride tetartohydrate.*—In a 500 ml., one-neck flask fitted with a condenser, bubbling tube, and carbon dioxide outlet was suspended $N^2$-, $N^5$-di-benzyloxycarbonyl-L-ornithinetetradecylamide (14.00 g., 0.023 mole) in methanol. A 10% excess of concentrated hydrochloric acid (4.22 ml., 0.0506 mole) and 5% palladium on charcoal catalyst (5 g.; 50% water by weight) were added. The suspension was stirred magnetically, warmed in a water bath at 45–50° and hydrogen slowly bubbled through. Carbon dioxide was given off after ½ hr. Evolution had ceased after 7½ hr. After 10 hr. the catalyst was filtered off and the filtrate evaporated to a gummy residue. Trituration with ether gave a hygroscopic solid (wt. 9.08 g.; M.P. 64–67° gel). The yield was 97%.

*Analysis.*—Calcd. for $C_{19}H_{41}N_3O.2HCl.¼H_2O$: C, 56.35; H, 10.82; N, 10.37. Found C, 56.50; H, 10.65; N, 10.16.

EXAMPLE VIII

L-ornithinehexadecylamide dihydrochloride

A. *Preparation of $N^5$-benzyloxycarbonyl - L - lysine-hexadecylamide.*—In a 500 ml., three-neck flask fitted with a stirrer, stopper and drying tube, was dissolved a 200% excess of hexadecylamine (14.49 g., 0.06 mole) in 50 ml. of tetrahydrofuran and the murky solution was stirred. The crude $N^2$-carboxyanhydride of $N^5$-benzyloxycarbonyl-L-ornithine (5.85 g., 0.02 mole) was dissolved in 50 ml. of tetrahdyrofuran and added to this solution. A precipitate formed, with some foaming due to carbon dioxide evolution. Additional tetrahydrofuran (100 ml.) was added, and the mixture was stirred overnight.

The insoluble material was filtered off and the filtrate evaporated. The residue was triturated with hexane, filtered and dried. This was then recrystallized from 35 ml. of hot ethanol, cooled to room temperature and the precipitate filtered off and dried. An additional recrystallization from 25 ml. of ethanol gave an analytical sample (wt. 3.82 g.; M.P. 98.5–99.5°). The yield was 39.0%.

*Analysis.*—Calcd. for $C_{29}H_{51}N_3O_3$: C, 71.12; H, 10.49; N, 8.58. Found: C, 71.06; H, 10.49; N, 8.63.

B. *Preparation of L-ornithinehexadecylamide dihydrochloride.*—In a 125 ml., one-neck flask fitted with a condenser, bubbling tube and carbon dioxide outlet was suspended $N^5$-benzyloxycarbonyl-L-lysinehexadecylamide (3.59 g., 0.007 mole) in methanol. A 10% excess of concentrated hydrochloric acid (1.28 ml., 0.0154 mole) was added, causing some of the amide to dissolve. The 5% palladium on charcoal catalyst (1 g.; 50% water by weight) was added and the suspension stirred magnetically at room temperature. Hydrogen was slowly bubbled through. Carbon dioxide was given off after 45 min., and continued to be evolved for 3½ hr. After 6 hr. the catalyst was filtered off and the filtrate evaporated. The residue was triturated with acetone, filtered, dried, and analyzed (wt. 2.93 g.; M.P. 88–92° gel). The yield was 97.7%.

*Analysis.*—Calcd. for $C_{21}H_{45}N_3O.2HCl$: C, 58.86; H, 11.05; N, 9.80. Found: C, 58.43; H, 10.96; N, 9.99.

EXAMPLE IX

L-2,4-diamino-N-hexadecylbutyramide dihydrochloride

A. *Preparation of $N^2$-, $N^3$-di-benzyloxycarbonyl-L-2,4-diamino-N-hexadecylbutyramide.* In a 250 ml., three-neck flask fitted with a stirrer, stopper and drying tube was dissolved $N^2$-, $N^4$-di-benzyloxycarbonyl-L-2,4-diaminobutyric acid (11.59 g., 0.03 mole) in tetrahydrofuran. The solution was cooled to 0° and triethylamine (4.16 ml., 0.03 mole) added. The solution was then stirred rapidly and cooled to −5° in an acetone/ice bath. The isobutyl chloroformate (3.90 ml., 0.03 mole) was added, causing triethylamine hydrochloride to precipitate. The mixture was stirred for ½ hr. at −5°. A 20% excess of hexadecylamine (8.69 g., 0.036 mole) partially dissolved in tetrahydrofuran was added to the mixed anhydride, and the mixture was stirred vigorously for 4 hrs. at room temperature.

The insoluble material was filtered off and 25 ml. of water added to the filtrate. The tetrahydrofuran was evaporated and the water insoluble material was filtered off, dried, and further triturated with hexane to give an analytical sample (wt. 6.53 g.; M.P. 122–124°).

*Analysis.*—Calcd. for $C_{36}H_{55}N_3O_5$: C, 70.90; H, 9.09; N, 6.89. Found: C, 71.02; H, 9.24; N, 6.79.

The original tetrahydrofuran insoluble material was triturated with water to dissolve the triethylamine hydrochloride, filtered and dried (wt. 10.35 g., M.P. 122–124°). This sample also analyzed correctly. The total yield was 92.2%.

B. *Preparation of L-2,4-diamino-N-hexadecylbutyramide dihydrochloride.*—In a 500 ml., one-neck flask fitted with a bubbling tube and carbon dioxide outlet was suspended $N^2$-,$N^4$-di-benzyloxycarbonyl-L-2,4 - diamino-N-hexadecylbutyramide (15.58 g., 0.025 mole) in methanol. A 10% excess of concentrated hydrochloric acid (4.58 ml., 0.055 mole) and 5% palladium on charcoal catalyst (7 g.; 50% water by weight) were added. The suspension was stirred magnetically, warmed in a water bath at 60°, and hydrogen slowly bubbled through. Carbon dioxide was evolved for 6½ to 8 hrs. The catalyst was filtered off from the hot suspension and the filtrate evaporated. The residue was triturated with acetone, filtered, dried, and analyzed (wt. 9.50 g.; M.P. 70–80° gel). The yield was 91.7%.

*Analysis.*—Calcd. for $C_{20}H_{43}N_3O.2HCl$: C, 57.95; H, 10.94; N, 10.13. Found: C, 57.66; H, 11.19; N, 9.68.

EXAMPLE X

L-2,4-diamino-N-pentadecylbutyramide dihydrochloride hemihydrate

A. *Preparation of $N^2$-, $N^4$-di-benzyloxycarbonyl-L-2,4-diamino-N-pentadecylbutyramide.*—In a 250 ml., three-neck flask fitted with a stirrer, stopper and drying tube was dissolved $N^2$-, $N^4$-di-benzyloxycarbonyl-L-2,4-diaminobutyric acid (11.59 g., 0.03 mole) in tetrahydrofuran. The solution was cooled to 0° and triethylamine (4.16 ml., 0.03 mole) added. The solution was then stirred rapidly and cooled to −5° in an acetone/ice bath. The isobutyl chloroformate (3.90 ml., 0.03 mole) was added, causing triethylamine hydrochloride to precipitate. The mixture was stirred for ½ hr. at −5°. A 20% excess of pentadecylamine (8.19 g., 0.036 mole) partially dissolved in tetrahydrofuran was added to the mixed anhydride, and the mixture was stirred vigorously for 4 hrs. at room temperature.

The insoluble material was filtered off and 25 ml. of water added to the filtrate. The tetrahydrofuran was evaporated and the water insoluble material was filtered off, dried, and further triturated with hexane to give an analytical sample (wt. 10.77 g.; M.P. 119–123°).

Analysis.—Calcd. for $C_{35}H_{53}N_3O_5$: C, 70.55; H, 8.96; N, 7.05. Found: C, 70.61; H, 9.12; N, 7.31.

The original tetrahydrofuran insoluble material was triturated with water, filtered and dried, to give an impure second crop (wt. 4.44 g.; M.P. 114–120°). The total yield was 85.1%.

B. Preparation of L-2,4-diamino-N-pentadecylbutyramide dihydrochloride hemihydrate.—In a 500 ml., one-neck flask fitted with a bubbling tube and carbon dioxide outlet was suspended $N^2$-, $N^4$-di-benzyloxycarbonyl-L-2,4-diamino-N-pentadecylbutyramide (10.70 g., 0.018 mole) in methanol. A 10% excess of concentrated hydrochloric acid (3.30 ml., 0.0396 mole) and 5% palladium on charcoal catalyst (5 g.; 50% water by weight) were added. The suspension was stirred magnetically, warmed in a water bath at 60°, and hydrogen slowly bubbled through. Carbon dioxide was evolved for about 8 hrs. The catalysts was filtered off from the hot suspension, and the filtrate evaporated. The residue was triturated with acetone, filtered, dried, and analyzed (wt. 6.29 g., M.P. 70–80° gel). The yield was 87.2%.

Analysis.—Calcd. for $C_{19}H_{41}N_3O \cdot 2HCl \cdot \frac{1}{2}H_2O$: C, 55.73; H, 10.83; N, 10.26. Found: C, 55.62; H, 10.87; N, 10.24.

EXAMPLE XI

L-2,4-diamino-N-tetradecylbutyramide dihydrochloride hemihydrate

A. Preparation of $N^2$-, $N^4$-di-benzyloxycarbonyl-L-2,4-diamino-N-tetradecylbutyramide.—In a 250 ml., three-neck flask fitted with a stirrer, stopper and drying tube was dissolved $N^2$-, $N^4$-di-benzyloxycarbonyl-L-2,4-diaminobutyric acid (11.59 g., 0.03 mole) in tetrahydrofuran. The solution was cooled to 0° and triethylamine (4.16 ml., 0.03 mole) added. The solution was then stirred rapidly and cooled to −5° in an acetone/ice bath. The isobutyl chloroformate (3.90 ml., 0.03 mole) was added, causing triethylamine hydrochloride to precipitate. The mixture was stirred for 40 min. at −5°. A 20% excess of tetradecylamine (7.68 g., 0.036 mole) partially dissolved in tetrahydrofuran was added to the mixed anhydride, and the mixture was stirred vigorously for 4 hr. at room temperature.

The insoluble material was filtered off and 25 ml. of water added to the filtrate. The tetrahydrofuran was evaporated and the water insoluble material was filtered off, dried, and triturated twice with hexane to give an analytical sample, M.P. 104–121°; wt. 9.36 g., (53.6%).

Analysis.—Calcd. for $C_{34}H_{51}N_3O_5$: C, 70.19; H, 8.83; N, 7.22. Found: C, 70.29; H, 8.96; N, 7.08.

B. Preparation of L-2,4-diamino-N-tetradecylbutyramide dihydrochloride hemihydrate.—In a 500 ml., one-neck flask fitted with a bubbling tube and carbon dioxide outlet was suspended $N^2$-, $N^4$-di-benzyloxycarbonyl-L-2,4-diamino-N-tetradecylbutyramide (9.14 g., 0.016 mole) in methanol. A 10% excess of concentrated hydrochloric acid (2.77 ml., 0.035 mole) and 5% palladium on charcoal catalyst (5. g.; 50% water by weight) were added. The suspension was stirred magnetically, warmed in a water bath at 60°, and hydrogen slowly bubbled through. Carbon dioxide was evolved for about 5 hr. The catalyst was filtered off from the hot suspension, and the filtrate evaporated. The residue was triturated with acetone, filtered, dried, and analyzed (wt. 5.04 g., M.P. 60–63° gel). The yield was 81.6%.

Analysis.—Calcd. for $C_{18}H_{39}N_3O \cdot 2HCl \cdot \frac{1}{2}H_2O$: C, 54.67; H, 10.70; N, 10.62. Found: C, 54.59; H, 10.72; N, 10.42.

What is claimed is:

1. A compound of the formula:

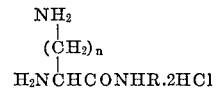

wherein R is a higher alkyl ($C_{12}$–$C_{18}$) group and $n$ is 2–4.

2. The compound of claim 1 L-lysinehexadecylamine dihydrochloride.

3. The compound of claim 1, L-lysinedodecylamide dihydrochloride hemihydrate.

4. The compound of claim 1, L-lysinepentadecylamide dihydrochloride.

5. The compound of claim 1, L-lysineteteradecylamide dihydrochloride.

6. The compound of claim 1, L-lysineoctadecylamide dihydrochloride.

7. The compound of claim 1, L-ornithinepentadecylamide dihydrochloride hemihydrate.

8. The compound of claim 1, L-ornithinetetradecylamide dihydrochloride tetartohydrate.

9. The compound of claim 1, L-ornithinehexadecylamide dihydrochloride.

10. The compound of claim 1, L-2,4-diamino-N-hexadecylbutyramide dihydrochloride.

11. The compound of claim 1, L-2,4-diamino-N-pentadecylbutyramide dihydrochloride hemihydrate.

12. The compound of claim 1, L-2,4-diamino-N-tetradecylbutyramide dihydrochloride hemihydrate.

References Cited

UNITED STATES PATENTS

| 2,710,857 | 6/1955 | Vaughan | 260—112 |
| 3,330,857 | 7/1967 | Hess | 260—471 |

OTHER REFERENCES

Schröder et al., "The Peptides," vol. I (1965), Academic Press, pp. 85–6.

Bamford et al., "Synthetic Polypeptides" (1956), Academic Press, pp. 29, 35, 41.

ALEX MAZEL, Primary Examiner

R. V. RUSH, Assistant Examiner

U.S. Cl. X.R.

260—307, 471; 424—320

PO-1050
(5/69)

UNITED STATES PATENT OFFICE
CERTIFICATE OF CORRECTION

Patent No. 3,574,747                    Dated April 13, 1971

Inventor(s)    George S. Denning, Jr.

It is certified that error appears in the above-identified patent and that said Letters Patent are hereby corrected as shown below:

Column 10, Claim 2, Line 1: "L-lysinehexadecylamine" should be
-- L-lysinehexadecylamide --

Signed and sealed this 22nd day of May 1973.

(SEAL)
Attest:

EDWARD M. FLETCHER, JR.                 ROBERT GOTTSCHALK
Attesting Officer                       Commissioner of Patent